Jan. 28, 1964  S. O. B. LJUNGBO  3,119,729
CAMOUFLAGE NET
Filed Sept. 9, 1960  3 Sheets-Sheet 1

INVENTOR
Sven Olof Birger Ljungbo

BY Pierce, Schiffler + Parker
his ATTORNEYS

INVENTOR
Sven Olof Birger Ljungbo

BY *Price, Schiffler & Parker*

ATTORNEYS

United States Patent Office 3,119,729
Patented Jan. 28, 1964

3,119,729
CAMOUFLAGE NET
Sven Olof Birger Ljungbo, Upplandsgatan 49, Stockholm, Sweden
Filed Sept. 9, 1960, Ser. No. 55,063
Claims priority, application Sweden June 13, 1955
6 Claims. (Cl. 161—89)

This invention, which is a continuation-in-part of my copending application No. 590,359, filed June 11, 1956, now abandoned, relates to camouflage devices and to a method of making such devices.

There are at present three main types of camouflage devices.

Perhaps the commonest form of camouflage device used during the 1914–1918 and 1939–1945 wars was a plain net to which branches of trees, leaves and the like were attached. This kind of device is reasonably sturdy, but it suffers from the grave disadvantage that a considerable time is required to attach the real camouflage, namely branches of trees, leaves etc. to it.

In order to overcome these disadvantages a kind of camouflage device somewhat similar to that described in U.S. specification No. 1,817,871 has been occasionally used. This device consists of a net to which pieces of fabrics, paper, cellophane etc. are attached by metal clips. This device is superior to the plain net in that it is effective immediately upon being spread. It, however, suffers from several major disadvantages. Firstly the pieces of fabric, paper, etc. often break loose from their metal clips; secondly when the device is used for camouflaging radar installations, the clips have a harmful effect on the radar image; thirdly the pieces of fabric, paper, cellophane absorb water; and fourthly the pieces of fabric, paper, cellophane etc. are not inherently flameproof, and even if they are treated with a medium to make them flameproof, the medium is fairly rapidly dissolved out in use.

The disadvantages of blurring the radar image, water absorption, and flammability can be avoided by using an apertured sheet of flameproof plastic having a camouflage pattern printed on one side. Such a sheet makes a good camouflage device but it has proved to be useless in the field because of its very low strength.

Thus neither an apertured plastic sheet nor a net to which pieces of fabric, paper or cellophane are attached by metal clips really satisfy the requirements of modern camouflage device.

The present applicant invented the camouflage device described in U.S. specification No. 2,825,168 in order to try to overcome the disadvantage of very low strength of the apertured plastic sheet. The camouflage device, described in this specification, is made by covering the strings of a net with layers of polyvinyl resin and rubber. This is effected by spraying the net with plastic to form a cobweb-like base, then spraying further plastic onto the cobweb-like base, and then finally breaking the webs of the plastic spanning the gaps between the strings of the net. The final device is a net whose strings are coated with thick layers of plastic. This method produces a technically satisfactory camouflage device. It is however very expensive, and this has precluded its manufacture on a commercial scale.

It is an object of this invention to overcome the disadvantages of the camouflage devices mentioned above.

It is a further object to produce a camouflage device which is substantially flameproof and which does not absorb water.

It is yet a further object of this invention to produce a camouflage device which does not include any metal parts.

The present invention is based upon the very surprising discovery that a sheet of flameproof plastic or several pieces of such a sheet can be attached by an adhesive to one side only of a net. It was before this invention firmly believed that the strength of the attachment to one side only of the net would be totally insufficient for a camouflage device; and it was for this reason that the complicated and expensive procedure described in U.S. specification No. 2,825,168 was resorted to. Camouflage devices in accordance with the present invention are now superseding the conventional types in the armed services of several major powers.

A camouflage device according to this invention comprises a single apertured sheet, or several pieces of a sheet, of substantially flameproof plastic, preferably polyvinyl chloride, a net, and an adhesive which attaches the sheet or each piece of plastic to one side only of the net.

There is preferably a camouflage pattern printed on the plastic sheet or pieces of plastic sheet.

The net may be made of monofil strings, or strings composed of a plurality of strands. If it is made of monofil strings, the adhesive has to be such that it adheres both to the plastic sheet and to the net, or two adhesives have to be used, namely one which adheres to the sheet and one which adheres to the net. If, on the other hand, the net is made of strands it is often possible to use a single adhesive which adheres to the sheet and which penetrates between the strands; the adhesive thus forms loops which hold the net in intimate contact with one side of the sheet.

The strands may be twisted or untwisted. It is however difficult to make a net of untwisted strands, and for this reason, it is desirable to impart a slight twist to the strands—for example 100 turns per metre. However string with a normal twist is fairly satisfactory. String composed of untwisted strands may be used without undue difficulty if the strands are held together in some way—for example by means of an impregnant. If the strings are made of normally twisted strands they are more liable to stretch than if made of untwisted or only slightly twisted strands. Excessive elasticity may result in the knots of the net shifting, and this may cause a reduction in the strength of the bond between the net and the sheet.

In order to minimize water absorption by the net and to obtain maximum strength for a given weight, the net is preferably made of plastic such as nylon.

In one method according to the invention, a camouflage design is printed on one side of a sheet of plastic, preferably polyvinyl chloride, the sheet is bonded to one side only of a net of monofil plastic filaments, and apertures are then formed in the sheet.

However, there is a danger that the net may be damaged when the apertures are being formed, and, for this reason, it is often desirable to form the apertures in the sheet before it is attached by the adhesive to the net.

The apertures in the sheet may, for example, be formed by mechanically piercing the sheet, or by directing jets of hot air or solvents onto the sheet. Such methods of making the apertures tend to produce a somewhat uniform pattern of apertures. It is therefore often preferable to attach a plurality of separate pieces of plastic sheet to the net, since this enables a more random pattern of voids in the device to be obtained.

The camouflage pattern may be formed on the sheet or pieces of sheet after the sheet or pieces of sheet have been attached to the net. It is however preferred to print the pattern on the sheet, or pieces of sheet, before attachment to the net since it is difficult to print the pattern after attachment.

The invention will now be further described, by way of example, with reference to the accompanying drawings in which.

Figure 1:
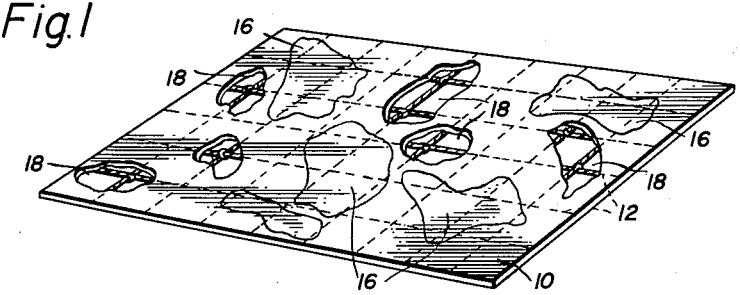
FIGURE 1 is a perspective view of a camouflage device according to the present invention.
Figure 2:
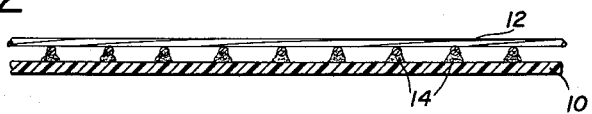
FIGURE 2 is a section, on an enlarged scale, through the net.

The device shown in FIGURES 1 and 2 consists of a polyvinyl chloride sheet 10, which is 0.08 mm. thick, a net 12 made of monofil nylon, and an adhesive 14 which bonds the net 12 to one side only of the sheet. The diameter of the monofil nylon is 0.6 mm., and the mesh size is 4 cms. A camouflage pattern 16 is printed on the sheet 10, and there are apertures 18 in the sheet.

Other suitable materials for the monofil net 12 are Saran (Registered Trademark for copolymerisate, containing vinylidene-chloride), and Terylene (Reg. Trademark for polyethylene terephthalate).

Other suitable materials for the plastic sheet 10 are Saran, copolymers of vinyl chloride, neoprene, chlorinated butyl rubber, sulfo-chlorinated polyethylene, non-inflammable polyethylene, hydrochlorinated rubber.

In most cases it is necessary to use two adhesives to bond a monofil net to a plastic sheet, as is described later with reference to FIGURES 5 to 8. However a mixture of polyvinyl chloride acetate and acryl-nitrile-butadiene rubber may be used by itself to bond a monofil nylon net to polyvinyl chloride sheet; either polymethylmethacrylate and other acryl-plastics, acrylo-nitrilo-butadiene rubber, polyvinyl chloride, or a mixture comprising 20% polymethylmethacrylate, 4% tricresyl phosphate, 5% dioctyl-phthalate, 3% toluene, 22% methyl ethyl ketone, and 8% cyclohexanone, may be used to bond a monofil Saran net to a polyvinyl chloride sheet; and a mixture comprising 10% acryl-nitrile-butadiene rubber, 15% vinyl chloride copolymer, 40% toluene, 10% acetone, 20% methyl ethyl ketone, and 5% cyclohexanone may be used to bond Saran sheets to Saran nets.

Figure 3:
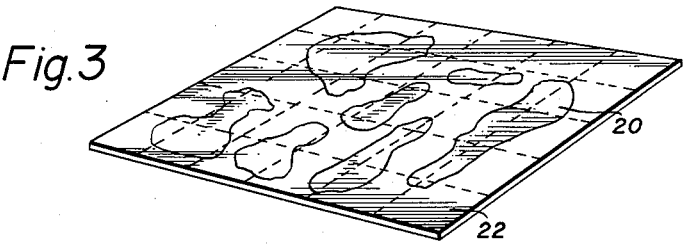
FIGURE 3 is a perspective view of another form of camouflage device.

Instead of bonding a whole sheet of polyvinyl chloride to the net, a plurality of separate pieces of polyvinyl chloride or other flameproof plastic may be attached to a net. Such a camouflage device is shown in FIGURE 3. A plurality of separate pieces 20 of polyvinyl chloride, which have a camouflage pattern printed on them, are bonded or attached, as described later with reference to FIGURE 4, to a net 22. By using several different pieces of polyvinyl chloride, it is simpler to obtain a random distribution of voids in the net.

Figure 4:
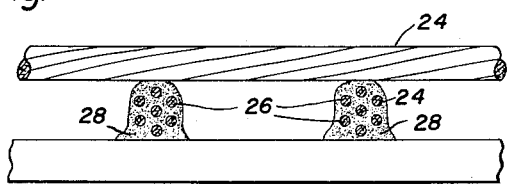
FIGURE 4 is a section, on a greatly enlarged scale, of a modification of the net shown in FIGURES 1 and 2.

In the modified device shown in FIGURE 4, the strings 24 of the net are composed of slightly twisted strands, and the adhesive is such that it firmly adheres only to the plastic sheet, or pieces of plastic sheet, which as before is preferably polyvinyl chloride. The adhesive 28 penetrates between the strands 26 of the net, and forms loops of adhesive which hold the net in intimate contact with the sheet or pieces of sheet.

When polyvinyl chloride sheet is used, the following are suitable adhesives; acrylonitrile butadiene rubber dissolved in mesityl oxide, polyvinyl chloride, polyvinyl butyral, polymethyl methacrylate, polyacrylates, acryl-plastics and copolymers of them.

The strings of the net may be made of other plastic materials such as Orlon or Saran or Terylene. They may also be made of natural fibres, such as hemp or cotton.

Four examples of making a net according to the invention will now be described.

EXAMPLE I

Figure 5:
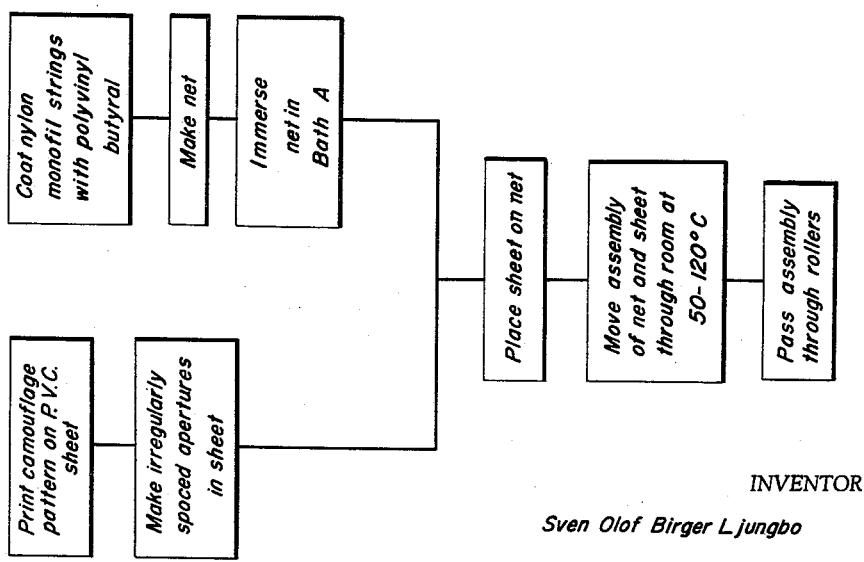

The main features of the method used in this example are shown in FIGURE 5.

A camouflage pattern is printed by means of a calender on a polyvinyl chloride sheet 0.08 mm. thick. A series of apertures or holes are next made in the sheet. These apertures may be made by jets of hot air at a temperature of 200–300° C.; by directing jets of molten lead or molten polyglycole on to the sheet when it is horizontally stretched; or by cooling the sheet until it becomes brittle, and then piercing holes in it by means of a peg roller or shots from a shot gun.

Nylon monofil string which has a diameter of 0.6 mm. and which is to be used for making the net is coated by immersing it in a bath of polyvinyl-butyral or isocyanate. The string is then made into a net which is 5 metres by 5 metres and which has a mesh size of 4 cm. The knots in the net are then fixed either by treating the net with a solvent for polyvinyl-butyral or by heating the net to 120–150° C. The polyvinyl-butyral or isocyanate adheres to the net.

The coated net is then immersed in a bath containing a mixture which adheres to the polyvinyl-butyral (or isocyanate) and the polyvinyl sheet. A suitable mixture is given in bath A below.

*Bath A*

8% acrylonitrile-butadiene rubber
0.3% zinc oxide
0.1% sulphur
0.3% butyl eight (accelerator)
4% toluene
21.3% acetone
30% cyclohexanone The net is next placed on the plastic sheet; and the assembly of net and sheet is moved through a room at a temperature of 50–120° C. As the assembly moves through the room the net and sheet are pressed together by felt covered rollers. The assembly of net and plastic sheet are not removed from the room until the mixture from bath A on the net has dried.

The sheet is now finally attached to the net and the manufacture of the camouflage device is complete.

Instead of the net being made of nylon monofil strings it may be made of Saran or Terylene. In both cases the net is coated with polyvinyl-butyral and made as described above.

Instead of the sheet being made of polyvinyl chloride it may be made of Saran, copolymers of vinyl chloride, neoprene, chlorinated butyl rubber, sulfochlorinated polyethylene, flameproof polyethylene, or hydrochlorinated rubber. In all these cases the adhesive, by which the polyvinyl-butyral coated net is attached to the sheet, is a solution of the material of the net.

EXAMPLE II

Figure 6:
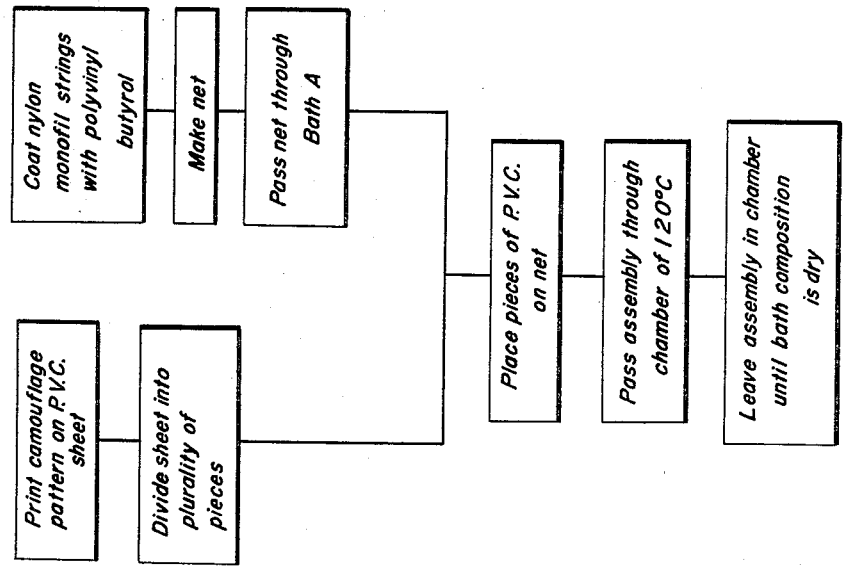
FIGURES 5 to 8 are diagrammatic representations of four different methods of making a net according to the invention.

The main features of the method used in this example are shown in FIGURE 6.

A camouflage pattern is printed on a 0.15 mm. thick sheet of polyvinyl chloride. The sheet is then divided into a plurality of separate pieces. A net of monofil nylon string is made in exactly the same way as described above in Example I, and is passed through Bath A.

The pieces of polyvinyl chloride are then placed on the net for example by being permitted to drop down from an overhead container as the net is moved slowly under the container, or by being strewed out manually.

The net with the pieces of polyvinyl chloride on it is then passed into a heating chamber maintained at a temperature of 120° C. The net is kept in the chamber until the adhesive picked up in Bath A has dried.

The net with the pieces of plastic firmly attached to it is then removed from the chamber; and the manufacture of the camouflage device is completed.

EXAMPLE III

Figure 7:
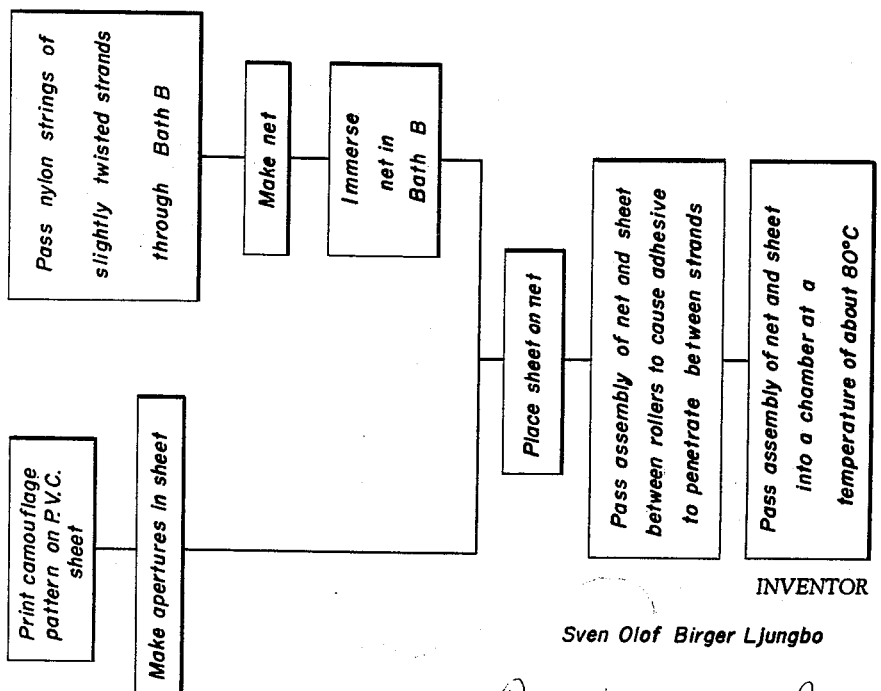

The main features of the method used in this example are shown in FIGURE 7.

A camouflage pattern is printed on a polyvinyl chloride sheet 0.08 mm. thick, and apertures are made in the sheet as described with reference to Example I.

Nylon string (6000 denier) composed of 2000 3 denier straings having a twist of 100 turns per metre is passed through Bath B. A net, 5 metres by 5 metres, is then made having a mesh size of 4 cms.

The completed net is then passed through Bath B again.

The sheet is next placed on the net, and the assembly of net and sheet is passed between rollers. The rollers force the material of Bath B through, so that it penetrates between the strands of the net.

The assembly of sheet and net is then passed into a chamber maintained at a temperature of about 80° C. to dry the adhesive. When the adhesive of Bath B is dry, it forms loops which penetrate between the strands of the net to hold the net in intimate contact with the sheet.

Bath B

23% PVC with K value=52 according to Fickeutscher
4% Dioctyl phthalate
3% Tricresyl phosphate
1% Basic plumbous phosphite
1% Antimony oxide
2% Pigment
25% Toluene
41% Cyclohexanone

EXAMPLE IV

Figure 8:
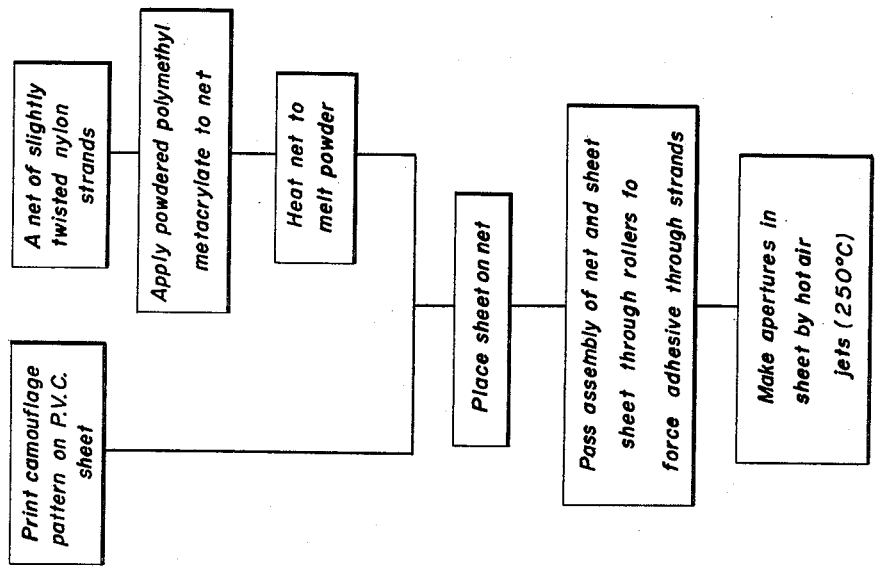

The main features of the method used in this example are shown in FIGURE 8.

A camouflage pattern is printed on a sheet of polyvinyl chloride which is 0.08 mm. thick.

A net whose strings comprise twisted nylon strands as described above is then made.

Powdered polymethyl methacrylate is next placed on the net; and the net is then heated to melt the powder.

The sheet of polyvinyl plastic is next placed on the net, and the assembly of net and sheet passed through rollers. The rollers force the adhesive between the strands of the net, and, when the adhesive is dry, it forms loops which hold the net in intimate contact with the sheet.

After the adhesive has dried, apertures are formed in the net as described with reference to Example I.

The camouflage devices made according to Examples I to IV are suitable for camouflaging tanks, large guns and ships.

A personal camouflage device may be made as described in Example III. In this case however the net is 1 by 2 metres, and is made from 840 denier nylon string consisting of 1.5 denier filaments. The twist is the same as before, namely 100 turns per metre.

What I claim is:

1. A flexible limp and drapeable camouflage net comprising a net structure formed from pliant textile strands, a water-insoluble adhesive coating on said net structure, and pieces of plastic sheet material bonded to one side only of said net structure by means of said adhesive coating.

2. A flexible limp and drapeable camouflage net comprising a net structure formed from pliant strands of organic plastic filaments, a coating of water-insoluble adhesive on said filaments, and pieces of plastic sheet material bonded to one side only of said net structure by means of said adhesive coating.

3. A flexible limp and drapeable camouflage net comprising a net structure formed from pliant strands of organic plastic filaments, a coating of polyvinyl chloride on said filaments and pieces of polyvinyl chloride sheet material bonded to one side only of said net structure by means of said polyvinyl chloride coating.

4. A flexible limp and drapeable camouflage net as defined in claim 1, further characterized in that the pieces of sheet material bear printed designs thereon.

5. A flexible limp and drapeable camouflage net as defined in claim 1, further characterized in that the net structure is formed from monofil organic plastic filaments.

6. A flexible limp and drapeable camouflage net as defined in claim 1, further characterized in that the net structure is formed from strings composed of strands of organic filaments, and in that said adhesive coating penetrating said strands form loops of adhesive securing said pieces of sheet material in intimate contact with said net structure.

References Cited in the file of this patent
UNITED STATES PATENTS

| | | |
|---|---|---|
| 1,817,871 | Brandt | Aug. 4, 1931 |
| 2,367,629 | Teppema | Jan. 16, 1945 |
| 2,390,663 | Pollard | Dec. 11, 1945 |
| 2,825,168 | Ekman | Mar. 4, 1958 |